United States Patent
Hightower

(10) Patent No.: US 6,835,022 B2
(45) Date of Patent: Dec. 28, 2004

(54) CONNECTOR FOR JOINING TOE KICK PLATE OF CABINET

(75) Inventor: Robert C. Hightower, High Point, NC (US)

(73) Assignee: Tenn-Tex Plastics, Inc., Colfax, NC (US)

(*) Notice: Subject to any disclaimer, the term of this patent is extended or adjusted under 35 U.S.C. 154(b) by 7 days.

(21) Appl. No.: 10/195,110

(22) Filed: Jul. 12, 2002

(65) Prior Publication Data

US 2004/0009035 A1 Jan. 15, 2004

(51) Int. Cl.⁷ .................................................. F16B 7/00
(52) U.S. Cl. ........................ 403/403; 403/205; 403/345
(58) Field of Search .......................... 403/403, 345–383, 403/205; 312/228, 278

(56) References Cited

U.S. PATENT DOCUMENTS

| | | | |
|---|---|---|---|
| 3,119,643 A | 1/1964 | Levi et al. ................... 312/343 |
| 4,381,876 A | * 5/1983 | Fenwick ..................... 312/114 |
| 4,383,397 A | 5/1983 | Ward ........................... 52/254 |
| 4,724,561 A | * 2/1988 | Falwell et al. ................. 5/658 |
| 5,039,181 A | 8/1991 | Lautenschlager ........... 312/343 |
| 5,310,255 A | 5/1994 | Ranallo .................... 312/334.5 |
| 5,457,867 A | 10/1995 | Maberry et al. ............... 29/525 |
| 5,597,220 A | 1/1997 | Domenig et al. ......... 312/334.4 |
| 5,647,687 A | 7/1997 | Robinson et al. ........... 403/403 |
| 5,746,490 A | 5/1998 | Domenig .................. 312/334.5 |
| 5,823,648 A | 10/1998 | Domenig .................. 312/334.5 |
| 5,833,337 A | 11/1998 | Kofstad .................... 312/334.5 |
| 5,904,412 A | 5/1999 | Lammens ................. 312/334.7 |
| 6,010,200 A | 1/2000 | Hays ........................ 312/334.7 |
| 6,070,957 A | 6/2000 | Zachrai ................... 312/334.4 |
| 6,155,660 A | 12/2000 | Nicolai .................... 312/223.1 |
| 6,270,281 B1 | 8/2001 | Ruusuvuori .................. 403/11 |
| 6,273,534 B1 | 8/2001 | Bueley et al. ........... 312/334.8 |
| 6,367,900 B1 | 4/2002 | Woerner ................... 312/334.5 |
| 6,402,276 B1 | 6/2002 | King ........................ 312/334.7 |
| 6,422,399 B1 | 7/2002 | Castillo et al. ............... 211/26 |
| 6,494,550 B1 | 12/2002 | Chen et al. .............. 312/334.5 |

* cited by examiner

*Primary Examiner*—Daniel P. Stodola
*Assistant Examiner*—Carlos Lugo
(74) *Attorney, Agent, or Firm*—Myers Bigel Sibley & Sajovec

(57) ABSTRACT

A connector for an enclosure comprises: a main panel having inner and outer surfaces and a front end; a toe kick support panel extending generally perpendicularly from an intermediate portion of the inner surface of the main panel; a toe kick retaining flange extending generally perpendicularly from the front end of the inner surface of the main panel, the toe kick retaining flange, the toe kick support panel, and the main panel inner surface defining an open toe kick channel; and a side edge retaining flange extending generally perpendicularly from the front end of the outer surface of the main panel. In certain embodiments, the toe kick retaining flange and the side edge retaining flange are directly opposite each other across the main panel.

25 Claims, 1 Drawing Sheet

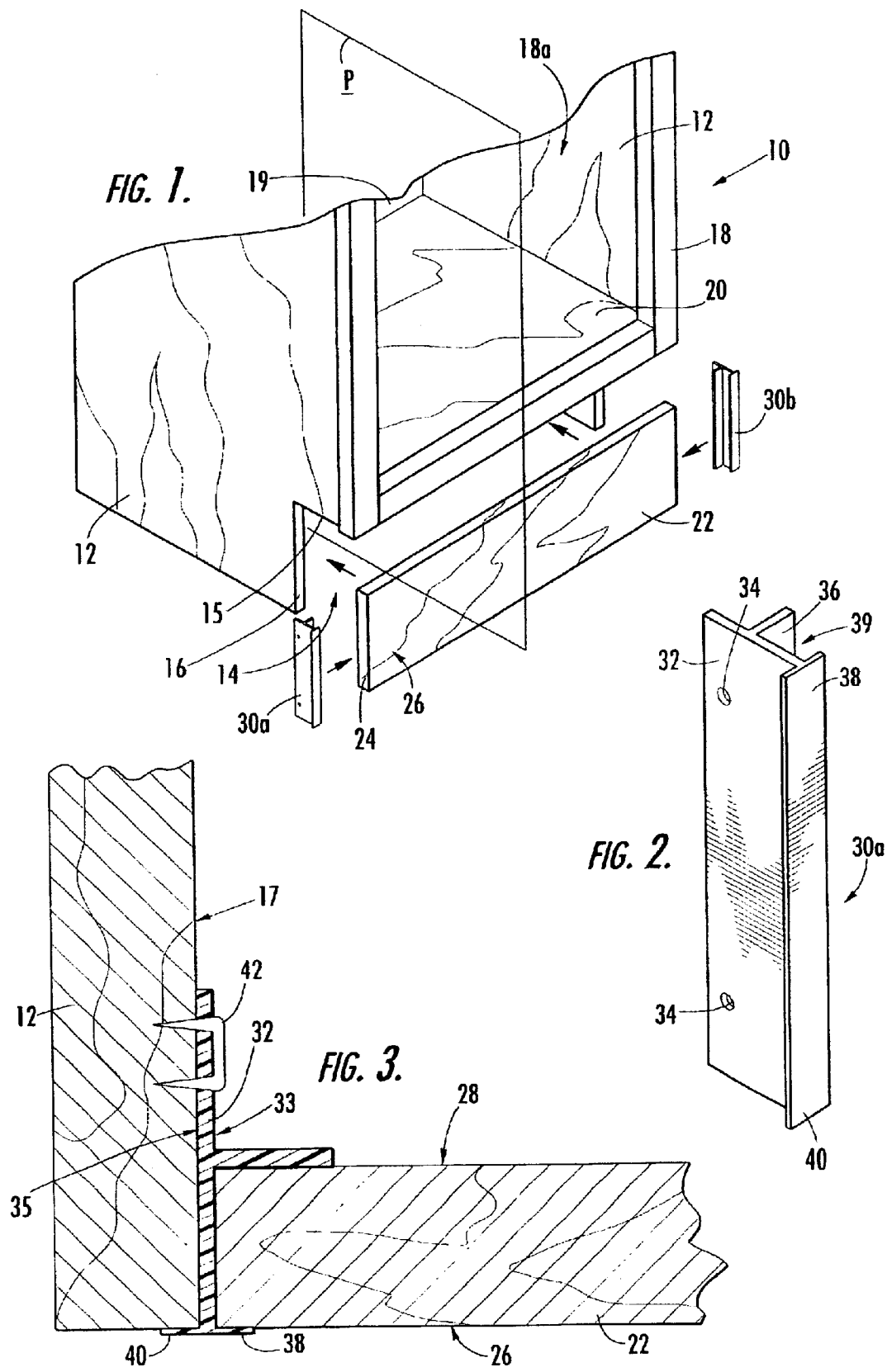

CONNECTOR FOR JOINING TOE KICK PLATE OF CABINET

FIELD OF THE INVENTION

The present invention is directed generally to furniture, and more particularly to cabinets.

BACKGROUND OF THE INVENTION

Many cabinets, particularly those found in kitchens and bathrooms, include a central storage cavity that is raised a few inches from the underlying surface. Such cabinets often include a floor that defines the bottom of the storage cavity, and are designed such that the front portion of the cabinet beneath the floor is recessed rearwardly from the front frame of the cabinet. This configuration enables a person to stand close to the front of the cabinet to, for example, use a sink or peer into a mirror; because the lower front portion of the cabinet is recessed, the person's feet can fit into the space, enabling the person to be positioned closer to the sink or mirror than would otherwise be the case.

Typically, such cabinets have a panel, called a "toe kick plate," that covers the recessed front lower portion of the cabinet. The toe kick plate is attached to the front edges of the side walls (usually to cutaway sections located on the lower front portions of the side walls). Traditionally, the toe kick plate and the side walls were joined with a wooden block that was nailed to the inner surfaces of the toe kick plate and the side walls. However, joints of this configuration can be prone to having gaps between the walls, which may enable pests to enter the cabinet. In addition, installation of the toe kick plate can be rather cumbersome with this joining technique.

To address this undesirable situation, plastic connectors for toe kick plates were developed; an exemplary connector is illustrated in U.S. Pat. No. 5,647,687 to Robinson et al. This connector includes perpendicular flanges that overlie the inner surfaces of the side walls and toe kick plate. A small retaining portion overlies the end of the outer surface of the toe kick plate, such that the toe kick plate is retained between the flange and the retaining portion. The flange that overlies the inner surface of the side wall is fastened thereto, usually with screws, nails, or staples. A hollow, generally rectangular body portion is positioned in front of the front edge of the side wall and outwardly from the outer edge of the toe kick plate and serves to fill the gap between these edges. The connector tends to fill the gaps between the toe kick plate and the side walls to prevent pest entry and is relatively easy to install, as the operator can simply position each end of the toe kick plate between the retaining portion and associated flange, place the other flange against the side walls of the cabinet, and quickly fasten them in place. This configuration may also facilitate replacement of the toe kick plate if necessary.

Although this connector has generally been popular, it has some shortcomings for some cabinets. For example, some customers may prefer the appearance of wood to that of the plastic connector, which covers the front edge of the side wall. As such, it would be desirable to provide a connector that can easily join a toe kick plate to the side walls of a cabinet but allows much of the front edge of the side wall to be visible.

SUMMARY OF THE INVENTION

The present invention is directed to an enclosure, such as a cabinet, that includes a connector that joins a front panel, like a toe kick plate, to a side wall. The enclosure comprises: a pair of side walls, each of the side walls extending longitudinally and having a front edge and an inner surface; a front plate extending transversely and having a front surface, a rear surface, and a pair of opposed side edges; and a connector. The connector comprises: a main panel having inner and outer surfaces and a front end, the outer surface overlying the inner surface of a first one of the side walls; a first support panel extending generally perpendicularly from an intermediate portion of the inner surface of the main panel and overlying the rear surface of the front plate; a first retaining flange extending generally perpendicularly from the front end of the inner surface of the main panel and overlying the front surface of the front plate; and a second retaining flange extending generally perpendicularly from the front end of the outer surface of the main panel and overlying the side edge of the first side wall. The enclosure further comprises a fastener fixing the connector to the first side wall extending through the main panel and into the first side wall. In this configuration, the toe kick plate or other front panel can be easily connected to the side walls with the connector and can visually display the side edge of the side wall.

In one embodiment, a connector for such an enclosure comprises: a main panel having inner and outer surfaces and a front end; a toe kick support panel extending generally perpendicularly from an intermediate portion of the inner surface of the main panel; a toe kick retaining flange extending generally perpendicularly from the front end of the inner surface of the main panel, the toe kick retaining flange, the toe kick support panel, and the main panel inner surface defining an open toe kick channel; and a side edge retaining flange extending generally perpendicularly from the front end of the outer surface of the main panel. In certain embodiments, the toe kick retaining flange and the side edge retaining flange are directly opposite each other across the main panel.

BRIEF DESCRIPTION OF THE FIGURES

FIG. 1 is a front, exploded, perspective view of a cabinet of the present invention.

FIG. 2 is a perspective view of a connector forming a part of the cabinet of FIG. 1.

FIG. 3 is a top, cross-sectional view of the cabinet of FIG. 1.

DETAILED DESCRIPTION OF THE INVENTION

The present invention will now be described more fully hereinafter, in which preferred embodiments of the invention are shown. This invention may, however, be embodied in different forms and should not be construed as limited to the embodiments set forth herein. Rather, these embodiments are provided so that this disclosure will be thorough and complete, and will fully convey the scope of the invention to those skilled in the art. In the drawings, like numbers refer to like elements throughout. Thicknesses and dimensions of some components may be exaggerated for clarity.

The present invention relates to a cabinet having a horizontal floor and vertical side and rear walls that define a portion of an access opening for the cabinet. As used herein, the terms "forward", "front" and derivatives thereof refer to the direction defined by a vector extending from the rear wall toward the access opening parallel to the floor. Conversely, the terms "rearward" and derivatives thereof refer to the direction directly opposite the forward direction; i.e., the rearward direction is defined by a vector that extends from the access opening toward the rear wall parallel to the floor. The forward and rearward directions together comprise the "longitudinal" directions relative to the cabinet. The term "outward" and derivatives thereof refer to the direction defined by a vector originating in the center of the floor and extending in the plane of the floor and perpendicular to the forward and rearward directions. The terms "inboard", "inward" and derivatives thereof refer to the direction directly opposite to the lateral direction as defined hereinabove. The outward and inward directions together comprise the "lateral" directions relative to the cabinet.

Referring now to the figures, a cabinet, designated broadly at 10, is shown in FIG. 1. The cabinet 10 includes a pair of longitudinally-extending side walls 12, a transversely-extending front frame 18, a rear wall 19, a horizontal floor 20, and a transversely-extending toe kick plate 22. Each side wall 12 includes a cutaway section 14 in its lower front corner. The front frame 18, which is typically formed of multiple planks joined at their ends to form an open rectangle that serves as an access opening 18a, extends transversely between and is attached to the front edges of the side walls 12, with its lower edge essentially even with the upper edges 15 of the side wall cutaway section 14. The floor 20 is mounted between the side walls 12 at approximately the level of the cutaway section upper edges 15. The toe kick plate 22 is mounted vertically and extends transversely between the cutaway section front edges 16.

Although the cabinet 10 is illustrated herein, those skilled in this art will appreciate that other enclosures, such as chests, bins, bureaus, vanities, and the like, that include a toe kick plate or similar front panel may also be suitable for the present invention. In some embodiments, the side walls 12 may lack the cutaway sections 14, such that the toe kick plate 22 or other front panel is not recessed in the manner exemplified by the cabinet 10.

As can be seen in FIGS. 1 through 3, the toe kick plate 22 is joined to the side walls 12 with connectors 30a, 30b attached at either end. Because the connectors 30a, 30b are mirror images of each other about a vertical plane P that is located equidistant between the side walls 12, only one connector 30a and its interaction with the toe kick plate 22 will described in detail below; those skilled in this art will appreciate that this discussion applies equally to the other connector 30b as well.

Referring now to FIGS. 2 and 3, the connector 30a is of substantially constant cross-section when viewed from the vantage point of FIG. 3. The connector 30a includes a main panel 32 that extends generally longitudinally. A toe kick support panel 36 extends inwardly and substantially perpendicularly from the central portion of the inner surface 33 of the main panel 32. A toe kick retaining flange 38 extends inwardly from the front end of the main panel 32, thereby forming a toe kick channel 39 with the front portion of the main panel 32 and the toe kick support panel 36, the toe kick channel 39 being open in the inward direction. The toe kick channel 39 is of a width that is slightly larger than the width of the toe kick plate 22 (typically between about ⅜ and ¾ inches). A side edge retaining flange 40 extends outwardly from the front end of the main panel 32 directly opposite from and substantially coplanar with the toe kick retaining flange 38. A pair of apertures 34 are present in the rear portion of the main panel 32.

The connector 30a is typically and illustratively constructed such that the main panel 32 and the toe kick support panel 36 are of approximately the same thickness (either or both is typically between about 0.060 and 0.125 inches in thickness), and the inward and outward flanges 38, 40 are of approximately the same thickness (either or is typically between about 0.025 and 0.050 inches in thickness) and relatively thinner than the main panel 32 and the toe kick support panel 36. It is preferred that the toe kick support panel extends farther inwardly than the toe kick retaining flange. The connector 30a is typically formed as a unitary member and from a polymeric material, such as polystyrene or ABS, but may be formed of other materials and may be formed in multiple pieces as desired.

Referring now to FIG. 3, the connector 30a joins the toe kick plate 22 with the side walls 12 as illustrated therein. The side edge 24 of the toe kick plate 22 is captured in the toe kick channel 39 and is captured therein, with the front surface 26 of the toe kick plate 22 overlying the rear surface of the toe kick retaining flange 38 and the rear surface 28 of the toe kick plate 22 overlying the front surface of the toe kick support panel 36. The rear surface of the side edge retaining flange 40 overlies the front edge 16 of the side wall cutaway section 14. The outward surface 35 of the main panel 32 overlies the inner surface 17 of the side wall 12. The main panel 32 can be fixed to the side wall 12 via staples 42 as illustrated or with other fasteners, such as screws, inserted through the apertures 34. Notably, typically no other fasteners are needed to secure the toe kick plate 22 to the side walls 12.

In this configuration, the front edges 16 of the cutaway section 14 are substantially coplanar with the front surface 26 of the toe kick plate 22. As such, they may be visible (which may be desirable) rather than covered as is the case with the connector illustrated in U.S. Pat. No. 5,647,687 to Robinson et al. discussed above. Also, the connector 30 may require less material, and therefore be less expensive to manufacture, than the connector of the Robinson patent.

The foregoing is illustrative of the present invention and is not to be construed as limiting thereof. Although exemplary embodiments of this invention have been described, those skilled in the art will readily appreciate that many modifications are possible in the exemplary embodiments without materially departing from the novel teachings and advantages of this invention. As such, all such modifications are intended to be included within the scope of this invention. The scope of the invention is to be defined by the following claims.

That which is claimed is:

1. A connector connecting a toe kick plate to a side wall of a cabinet, the side wall having a front edge and the front edge having a front edge width, the connector comprising:
   a main panel having inner and outer surfaces, each having a front end;
   a toe kick support panel extending generally perpendicularly from an intermediate portion of the inner surface of the main panel;
   a toe kick retaining flange extending generally perpendicularly from the front end of the inner surface of the main panel, the toe kick retaining flange, the toe kick support panel, and the main panel inner surface defining an open toe kick channel; and
   a side edge retaining flange extending generally perpendicularly from the front end of the outer surface of the main panel a distance less than the front edge width such that a portion of the front edge remains exposed when the connector is mounted thereon.

2. The connector defined in claim 1, wherein the side edge retaining flange is positioned directly opposite the toe kick retaining flange across the main panel.

3. The connector defined in claim 1, wherein the toe kick channel has a width between the toe kick support panel and the toe kick retaining flange, the width being between about 0.060 and 0.125 inches.

4. The connector defined in claim 1, wherein the main panel includes apertures positioned rearwardly of the toe kick support panel.

5. The connector defined in claim 1, wherein the connector is a unitary structure.

6. The connector defined in claim 1, wherein the connector is formed of a polymeric material.

7. The connector defined in claim 1, wherein the toe kick retaining flange and the side edge retaining flange are of substantially the same thickness.

8. The connector defined in claim 1, wherein the toe kick support flange and the main panel are of substantially the same thickness.

9. The connector defined in claim 1, wherein the toe kick support flange extends away from the main panel a greater distance than the toe kick retaining flange.

10. An enclosure, comprising:
    a pair of side walls, each of the side walls extending longitudinally and having a front edge and an inner surface, each of the front edges having a front edge width;
    a front plate extending transversely and having a front surface, a rear surface, and a pair of opposed side edges;
    a connector, the connector comprising:
        a main panel having inner and outer surfaces, each having a front end, the outer surface overlying the inner surface of a first one of the side walls;
        a first support panel extending generally perpendicularly from an intermediate portion of the inner surface of the main panel and overlying the rear surface of the front plate;
        a first retaining flange extending generally perpendicularly from the front end of the inner surface of the main panel and overlying the front surface of the front plate; and
        a second retaining flange extending generally perpendicularly from the front end of the outer surface of the main panel a distance less than the front edge width such that the second retaining flange overlies the front edge of the first side wall and a portion of the front edge remains exposed; and
    a fastener fixing the connector to the first side wall extending through the main panel and into the first side wall.

11. The enclosure defined in claim 10, wherein the fastener is selected from the group consisting of staples and screws.

12. The enclosure defined in claim 10, wherein the front plate comprises a toe kick plate, the first support panel comprises a toe kick support panel, the first retaining flange comprises a toe kick retaining flange, and the second retaining flange comprises a side edge retaining flange.

13. The enclosure defined in claim 12, wherein the side edge retaining flange is positioned directly opposite the toe kick retaining flange across the main panel.

14. The enclosure defined in claim 12, wherein the toe kick plate has a width between about 0.375 and 0.75 inches.

15. The enclosure defined in claim 12, wherein the main panel includes apertures positioned rearwardly of the toe kick support panel.

16. The enclosure defined in claim 10, wherein the connector is a unitary structure.

17. The enclosure defined in claim 10, wherein the connector is formed of a polymeric material.

18. The enclosure defined in claim 12, wherein the toe kick retaining flange and the side edge retaining flange are of substantially the same thickness.

19. The enclosure defined in claim 12, wherein the toe kick support flange and the main panel are of substantially the same thickness.

20. The enclosure defined in claim 12, wherein the toe kick support flange extends inwardly a greater distance than the toe kick retaining flange.

21. The enclosure defined in claim 12, wherein each of the side walls has a cutaway section in a lower front corner thereof, and wherein the side edge retaining flange overlies a front edge of the cutaway section of the first side wall.

22. A connector connecting a toe kick plate to side wall of a cabinet, the side wall having a front edge and the front edge having a front edge width, the connector comprising:
    a main panel having inner and outer surfaces, each having a front end;
    a toe kick support panel extending generally perpendicularly from an intermediate portion of the inner surface of the main panel;
    a toe kick retaining flange extending generally perpendicularly from the front end of the inner surface of the main panel, the toe kick retaining flange, the toe kick support panel, and the main panel inner surface defining an open toe kick channel; and
    a side edge retaining flange extending generally perpendicularly from the front end of the outer surface of the main panel directly opposite the toe kick retaining panel a distance less than the front edge width such that a portion of the front edge remains exposed when the connector is mounted thereon;
    wherein the connector is a unitary structure and is formed of a polymeric material.

23. The connector defined in claim 22, wherein the toe kick retaining flange and the side edge retaining flange are of substantially the same thickness.

24. The connector defined in claim 22, wherein the toe kick support flange and the main panel are of substantially the same thickness.

25. The connector defined in claim 22, wherein the toe kick support flange extends inwardly a greater distance than the toe kick retaining flange.

* * * * *